United States Patent [19]

Tau

[11] Patent Number: 4,531,301
[45] Date of Patent: Jul. 30, 1985

[54] TWO-WAY LEVEL

[76] Inventor: Ralph Tau, R.D. #3, Saegertown, Pa. 16433

[21] Appl. No.: 628,794

[22] Filed: Jul. 9, 1984

[51] Int. Cl.³ .............................................. G01C 9/28
[52] U.S. Cl. ...................................................... 33/382
[58] Field of Search ................. 33/382, 381, 384, 379, 33/383, 377, 365, 348.2

[56] References Cited

U.S. PATENT DOCUMENTS

| | | |
|---|---|---|
| 1,683,065 | 9/1928 | Carpenter et al. ..................... 33/382 |
| 2,466,829 | 4/1949 | Sprinkel ................................ 33/382 |
| 2,633,640 | 4/1953 | Bucsko ............................... 33/382 X |
| 2,752,692 | 7/1956 | Smith ................................ 33/382 X |
| 2,906,031 | 9/1959 | Rice .................................... 33/382 |
| 3,303,569 | 2/1967 | Wyatt ............................... 33/382 X |

Primary Examiner—William D. Martin, Jr.
Attorney, Agent, or Firm—Charles L. Lovercheck; Wayne L.a Lovercheck; Dale R. Lovercheck

[57] ABSTRACT

A level for leveling in three dimensions such as leveling the top surface and corner edges of a wall. The level has a body that is L-shaped in cross section with two legs at right angles to one another. The legs are made of plate like members with equally spaced holes. Some of the holes have level vials in them. Each leg has a longitudinally extending rib. The vials are supported in rings fixed to the sides of the plate like legs. The rings could be fixed in position by set screws or other fastening means. The ribs are at least as thick as the rings so that they protect the rings and the vials supported in the rings.

10 Claims, 4 Drawing Figures

TWO-WAY LEVEL

BACKGROUND OF INVENTION

The manufacture of leveling instruments presently requires relatively highly skilled labor in final production phases to precisely align the level and to plumb vials thereof in relation to the working surfaces of the level frame. Precise vial alignment is accomplished as a separate operation at a substantial cost. The frames of two way levels are inherently heavy and cumbersome. Examples of present vial supports are shown in the U.S. Patents to H. J. Ziemann U.S. Pat. Nos. 2,750,678 and 2,810,206.

Two way levels have been provided, but these levels are heavy and inconvenient to use or they are not sufficiently rigid and accurate. U.S. Pat. No. 1,501,814 and U.S. Pat. No. 1,845,801 show examples of known designs of two way levels. Levels shown in these patents are typical of two way levels.

GENERAL STATEMENT OF THE INVENTION

The present invention discloses a two way level and via construction which will produce substantial reduction in the cost of manufacture of level instruments through a reduction in both material and labor requirements and yet provide a leveling instrument that will level in two or more planes simultaneously. Further, instruments produced in accordance with the invention will provide the user greater flexibility both in the ease of replacement of broken parts and in the simple method provided for converting the angular relationship of a vial in a particular cell with a working surface of the instrument.

Since the vial of the invention utilizes a generally barrel shaped bubble chamber, the customary grouping of vials in pairs in a level instrument is no longer required. Where two vials were previously found to be necessary, one vial will now suffice. This results in the realization of an appreciable reduction in the cost of manufacture of level instruments.

The level frame is fabricated with precision mounting means for engaging and retaining the vial. Two similar legs of an "L" shaped frame are integrally attached. The vial itself is prepared for a precision fit in the mounting means of the frame. However, in spite of the fact that both the vial and frame are prepared for precision mounting, unskilled labor can readily accomplish the installation of the vial in the frame. As a result of the simple construction, the labor involved requires no difficult adjustment of the vial to properly register the bubble of the vial with the indicator provided thereon. There is no requirement for an assembler to visually observe, judge and adjust the position of the vial to obtain a predetermined bubble alignment. The assembler merely inserts the vial into the mounting means provided on the frame of the instrument, adjusts the vial to its proper position and secures the mounting rings to the frame or otherwise secures the vials in adjusted positions.

Due to the simplicity of vial installation, the owner of an instrument with damaged vials may easily and conveniently replace them himself with the assurance that the repaired instrument will provide the same accuracy as a factory tested unit. He is, therefore, spared the inconvenience and loss of time ordinarily involved in returning the damaged instrument to the manufacturer for re-installation of a vial cell and the adjustment thereof.

Due to the method devised for installing the vial of the invention in the frame of a level instrument, the fabrication of precision vial bodies can be accomplished utilizing plastic materials and high speed mass production techniques with a resultant reduction in the cost of both materials and labor.

The vial of the invention is ordinarily fabricated from an acrylic plastic tubular extrusion. The central portion of the interior of the tube is shaped to a generally barrel configuration; or more precisely, it assumes the general configuration of the middle frustum of a prolate spheroid. A pair of parallel annular grooves are cut into the external periphery of the vial and are spaced equidistantly from the midpoint of the barrel portion of the tube. These grooves serve as bubble alignment guides.

A problem has existed in leveling structures like the inside or outside of a corner of a building or a room or vertical pipe or studding that is intended to be level in two planes. With the conventional level it is not possible to level the two sides simultaneously because the level must be moved around from one place to the other. Simple angular planes have been provided but they present problems in attaching the level vial. Applicant has provided a unique level frame having working surfaces which are available at several different positions, both for inside corners, outside corners and for flat surfaces. The level frame is rigid and relatively thick. The weight of the level has been reduced dramatically by forming large holes in the webs forming the legs of the level.

OBJECTS OF THE INVENTION

It is an object of the invention to provide an improved level.

Another object of the invention is to provide a level that will level in two planes that are at right angles to one another simultaneously.

Another object of the invention is to provide a level that is simple in construction, economical to manufacture and simple and efficient to use.

Another object is to provide a level instrument having an improved rigid frame, simple, light in weight and efficient vial supports.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWING

DETAILED DESCRIPTION OF DRAWING

Figure 1:
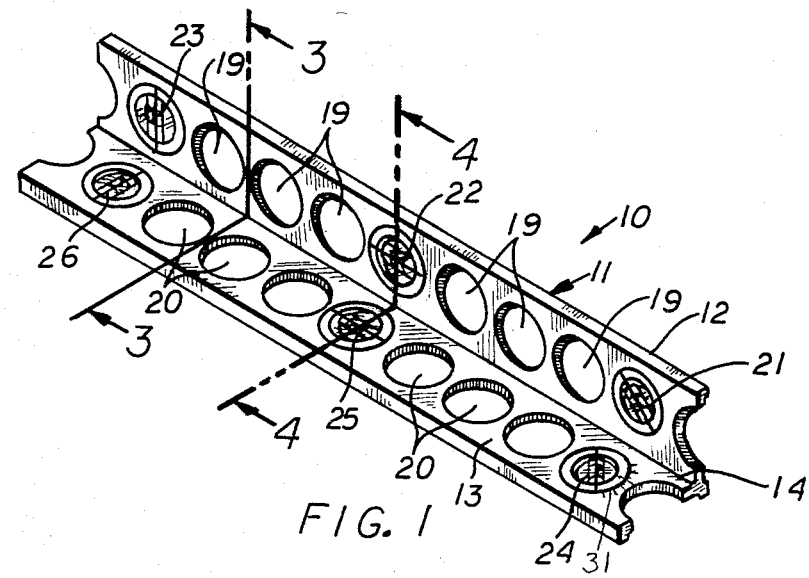
FIG. 1 is a partial isometric view of the level according to the invention.
Figure 2:
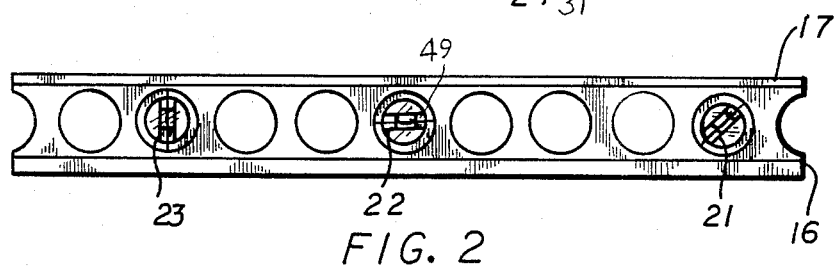
FIG. 2 is a side view of the level shown in FIG. 1.
Figures 3, 4:
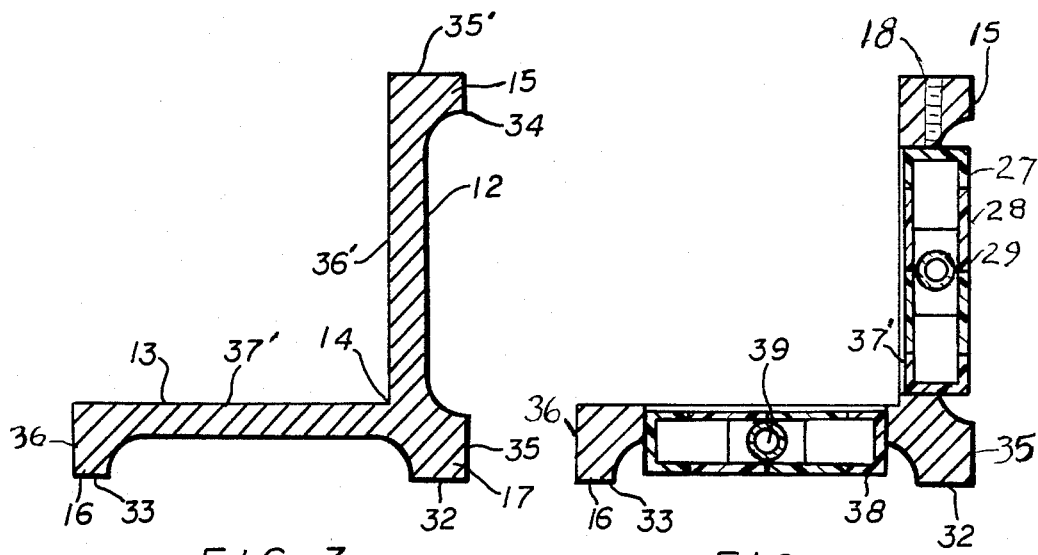
FIG. 3 is a longitudinal cross sectional view taken on line 3—3 of FIG. 1.
FIG. 4 is a cross sectional view taken on line 4—4 of FIG. 1.

Now with more particular reference to the drawings a level 10 is shown which has a body 11 which is L-shaped in cross section, made of elongated longitudinally extending plate like first leg 12 and elongated longitudinally extending plate like second leg 13 that are integrally joined together at an apex 14. Each of the plate like legs 12 and 13 have longitudinally spaced holes 19 and 20 respectively formed therein. Some of the holes 19 and 20 function both to receive vials 21 through 26 and to reduce the weight of the level body 11, other of holes 19 and 20 function to reduce weight only. The vials 21 through 26 are held in place, in the holes, by outer ring 27 and inner ring 28 which receive vial element 29 which may be made in accordance with the vial holders shown in U.S. Pat. No. 2,810,206 or any other suitable vial holding devices known to those skilled in the art could be used. However, a single barrel shaped via element could be used instead of the multiple vial elements shown in U.S. Pat. No. 2,810,206. For example, the vials could be held in place by notches formed in the web of the outer periphery of the holes in the webs as in U.S. Pat. No. 3,311,990. Set screws could be used to hold the vials in place.

The leg 12 has a first rib 15 on its distal end and the leg 13 has a second rib 16 on its distal end. The apex 14 has a third rib 17 on it. Legs 12 and 13 have working surfaces 36' and 37' respectively that can be used to engage the walls of an outside corner or a vertical stud or pipe to level it in two planes simultaneously. Rib 15 has working surfaces 34 and 35', rib 16 has working surfaces 33 and 36, and rib 17 has working surfaces 32 and 35. Working surface 34 is disposed in a first common plane with working surface 35. Working surface 32 is disposed in a second common plane with working surface 33. Working surface 36' is disposed in a third plane and surface 37' is disposed in a fourth plane at right angles to each other. These working surfaces 32, 33, 34, and 35 can be used to engage the walls of an inside corner to level both walls simultaneously. Surfaces 32 and 33 as well as surfaces 34 and 35 can be used to level planar surfaces. The holes 19 and 20 are substantially the same inside diameter as the outside diameter of the outer vial support rings 27 that receive the inner rings 28 which support the vial elements 29.

The rings 27 and 28 making up the vial supports 21, 22 and 23 are slightly thinner than the distance between the first plane and the third plane. In like manner, the rings 27 and 28 making up the vial supports 24, 25 and 26 are thinner than the distance between the third plane and the fourth plane.

The level vial elements indicated generally at 29 may be made of plastic, metal or other suitable material. The vial elements may have their ends cemented to the inner periphery of the inner rings 28 by any suitable adhesive or they may be attached in the manner shown in the U.S. Pat. No. 2,679,698, for example, or any other way familiar to those skilled in the art of supporting vials to level bodies. The level vial elements could be held in place by a set screw such as set screw 18 which may be threaded through the side of the level body into engagement with the ring 27 or 28 or the screw could be placed at any other convenient manner according to good mechanical skill. The vials could be provided with protractor marks like angular marks 31 to set the vial rings for selected angles. The inner ring 28 is rotatably supported in the inner ring 27 and may be rotated to adjust the bubble 39 and then lock it in position by means of a set screw, or other fastening means. The outer ring 28 may be secured in place by cement or other suitable means after the rings are rotated to center the bubble 39 or the vial element 29 can be rotated to adjust the bubble 39 by first cementing or otherwise attaching the inner ring 28 to the outer ring 27 to the desired position where the bubbles 39 of the vial elements 29 are centered with respect to marks 49 with the level working surfaces resting on a suitable reference surface and the rings 27 and 28 rotated to the proper position.

It will be noted that the level vial elements 29 of vial supports 22 and 25 are parallel to one another and perpendicular to the level vial supports 23 and 26. In like manner the vial supports 21 and 24 are disposed at 45° angles to the other vials. The vials 25 and 29 could be adjusted by a suitable protractor marks to the desired angle.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A level comprising a body having a first plate like leg and a second plate like leg integrally connected together at an apex and disposed at right angles to one another,
   said first leg having a first outwardly extending rib on its outside of its distal end and said second leg having a second outwardly extending rib on its outside of its distal end,
   said legs having a third rib attached to said legs on its outside of said apex,
   said first rib having a first outwardly directed first working surface,
   said first rib having a second outwardly directed working surface,
   said third rib having a third working surface and a fourth working surface,
   said third working surface and said fourth working surface being disposed at right angles to one another,
   said second working surface being coplanar with a first plane passing through said third working surface,
   said second working surface being coplanar with a second plane passing through said third working surface,
   a plurality of first generally equally spaced holes in said first plate like leg,
   a plurality of second generally equally spaced holes in said second plate like leg,
   a first level vial in said first leg in one of said spaced holes,
   a second level vial in said second leg in one of said spaced holes,
   and means supporting said level vials in said first leg and in said second leg,
   said legs and said ribs being of greater thickness than said means supporting said vial.

2. The level recited in claim 1 wherein said means supporting said vials comprise rings substantially the same diameter as said holes in said legs and fitting into said holes.

3. The level recited in claim 2 wherein said first leg has a fifth working surface on the side opposite said first working surface and said second leg has a sixth working surface on the side opposite said second working surface and some of said vial support means are disposed between said fifth working surface and said first plane and some of said vial supports are disposed between said sixth working surface and said second plane.

4. The level recited in claim 1 wherein said vial support means are each disposed in at least one said hole in said first leg and at least one vial support means in said second leg.

5. The level recited in claim 2 wherein said means supporting said vial in said ring comprises cement fixing the ends of said vials to said ring.

6. The level recited in claim 1 wherein at least one said vial is disposed in each said leg.

7. The level recited in claim 1 wherein at least two vials are supported in each said leg.

8. The level recited in claim 2 wherein some of said rings are disposed between said fifth working surface and a plane passing through said first working surface and said third working surface, other said rings are disposed between said sixth working surface and a plane passing through said second and said fourth working surface.

9. The level recited in claim 2 wherein said supporting means supporting said vial in said ring comprises a threaded set screw threadably engaging said body.

10. The level recited in claim 9 wherein at least one said level vial has marks thereon providing a protractor.

* * * * *